United States Patent [19]

Talbott

[11] Patent Number: 4,616,578
[45] Date of Patent: Oct. 14, 1986

[54] AUTOMATIC METHOD AND APPARATUS FOR TRANSPLANTING CROPS

[76] Inventor: Gene B. Talbott, Box 173-D, Rte. 1, Banks, Oreg. 97106

[21] Appl. No.: 493,992

[22] Filed: May 12, 1983

[51] Int. Cl.$^4$ ............................................... A01C 11/00
[52] U.S. Cl. ........................................................ 111/2
[58] Field of Search ........................................ 111/1–3, 111/89

[56] References Cited

U.S. PATENT DOCUMENTS

| | | | |
|---|---|---|---|
| 3,446,164 | 5/1969 | Huang et al. | 111/3 |
| 3,712,252 | 1/1973 | Huang | 111/2 |
| 3,820,480 | 6/1974 | Blackmore et al. | 111/2 |
| 3,894,589 | 7/1975 | Ciraud | 111/2 X |
| 3,923,332 | 12/1975 | Shirouzo | 111/2 X |
| 4,133,174 | 1/1979 | Orth et al. | 111/2 |
| 4,182,247 | 1/1980 | Talbott | 111/3 |
| 4,186,671 | 2/1980 | Huang | 111/2 |
| 4,294,179 | 10/1981 | Cayton et al. | 111/3 |
| 4,388,035 | 6/1983 | Cayton et al. | 111/2 X |
| 4,408,549 | 10/1983 | Qvarstrom | 111/2 |
| 4,440,101 | 4/1984 | Edwards et al. | 111/2 |
| 4,454,829 | 6/1984 | Sena | 111/2 |

Primary Examiner—Robert A. Hafer
Assistant Examiner—Danton DeMille
Attorney, Agent, or Firm—Kolisch, Hartwell & Dickinson

[57] ABSTRACT

Automatic method and apparatus for transplanting crops includes a transplanting apparatus which receives trays of seedlings from a greenhouse and sequentially displaces the seedlings from the trays into selected crop rows via an automatic process. The method and apparatus utilizes a plurality of fluid dispensers mounted on the transplanting apparatus selectively operable for directing fluid against the ground to form a plurality of laterally spaced-apart plant-receiving cavities. The fluid dispensers are positioned in advance of a carriage which is provided on the apparatus for receiving a plurality of seedling trays. The carriage is provided with plant setters which are selectively operable for engaging selected seedlings in selected rows of the seedling trays and displacing them substantially vertically downwardly from a selected cell into a plant-receiving cavity.

10 Claims, 15 Drawing Figures

AUTOMATIC METHOD AND APPARATUS FOR TRANSPLANTING CROPS

BACKGROUND AND SUMMARY OF THE INVENTION

The present invention relates to agricultural implements and machinery, and more particularly to a novel method and apparatus operable for transplanting plants automatically, such as seedlings from a seedling tray into preselected rows in a field.

The process of transplanting row and vegetable crops has gained popularity in recent years and various attempts have been made to streamline the transplanting and automate the process. The use of transplanting, i.e. growing seedlings in a greenhouse and then transplanting them to a field, has been found to be an efficient agricultural process for crops such as celery, lettuce, cauliflower, peppers, tomatoes, broccoli, brussel sprouts, beets, asparagus, etc. Some of these crops, such as lettuce and celery, are "high density" crops, i.e. anywhere from 30,000 to 45,000 plants per acre are planted, and it should become apparent that an extremely efficient agricultural machine is necessary to accomplish such high density planting.

There have been many proposals in the prior art for agricultural machines designed for transplanting purposes. Exemplary of such devices are the transplanters set forth in Huang, U.S. Pat. No. 3,712,252 and Huang et al., U.S. Pat. No. 3,446,164. In the '164 patent, the transplanter disclosed is a wheeled device operable for being pulled behind a tractor and includes a so-called automatic transplanting device, of the gravity type, which regulates the velocity of impact between a plant and the earth. The transplanting device is constructed with blade-like openers for creating a furrow in the soil for receiving plants and it is provided with a bore operably connected to what are referred to as vacuum sleeves for directing plants from a tray mounted on the device downwardly through the vacuum sleeve and into the furrow created by the aforementioned openers.

Another type of plant setting machine is disclosed in Burrows, U.S. Pat. No. 2,804,033 which includes a device having fingers which automatically open and close to receive a plant at one position of an operating cycle and to open at another portion and deposit the plant. A furrow opening device, of conventional shoe construction, is used in conjunction with the setting fingers to create a furrow for the plant to be deposited. After the plant is set in place, a control valve, responsive to the operation of the setting fingers, is actuated to release water into the furrow for irrigating the plants during transplanting intervals.

Another example of a transplanting method and apparatus is set forth in Talbott, U.S. Pat. No. 4,182,247. The method and apparatus set forth in that patent contemplates the use of a vehicular frame having a carriage which is reciprocally shiftable relative to the length of the frame. There are incorporated a plurality of fluid dispensing nozzles on the carriage for injecting fluid jets in the ground to form crop-receiving cavities. The vehicular frame is pulled behind a tractor and the carriage is maintained substantially immobile relative to the ground during fluid injection while the frame is continuously advanced. After the cavities are formed, seedlings are manually introduced thereinto. Seats are arranged on the frame and a support for holding a seedling tray is also mounted proximal to the seats. An individual or individuals are seated on the frame, and during transport over a field to be transplanted, seedlings are removed manually from a tray and placed into the cavities which have been formed by the fluid dispensing nozzles.

The use of fluid injection to create crop or plant-receiving cavities, as set forth in U.S. Pat. No. 4,182,247 described above, has been found to be very advantageous. However, that patent does not set forth a method and apparatus which is totally automatic for transplanting crops. One of the problems resides in the fact that it has been found problematical to develop a system which will gently handle seedlings grown in seedling trays to place them into the ground. The preferred method would be to provide some type of transplanting device which would be operable for removing seedlings from a seedling tray and without damage to the root system or soil medium, place the seedling into a crop-receiving cavity.

Accordingly, it is an object of the present invention to provide a method and apparatus for transplanting crops which contemplates providing a transplanting apparatus having means for receiving trays of seedlings, direct from a greenhouse, and sequentially displace seedlings from those trays into selected crop rows via an automatic mechanical process.

It is another object of the present invention to provide a method and apparatus which utilizes a plurality of fluid dispensing means mounted on the transplanting apparatus selectively operable for directing fluid against the ground to form a plurality of laterally spaced-apart plant-receiving cavities. The fluid dispensing means are positioned in advance of a carriage means which is provided on the apparatus for receiving a plurality of seedling trays. The carriage means is also provided with plant setter means which are selectively operable for engaging selected seedlings and displacing them substantially vertically downwardly from a selected cell in a seedling tray into a plant-receiving cavity.

It is another object of the present invention to provide plant setter means which are operable for holding and controllably guiding a seedling from a seedling tray in a substantially vertical position for placement into a plant-receiving cavity. To this end, the present invention contemplates that each plant setter means will include an impaling means which is slidably received within a pusher means. The impaling means is directed into the soil system of a seedling to a predetermined depth for holding the seedling substantially vertically during a transplanting step. The pusher means includes a foot which engages the top of the seedling for urging it downwardly through its cell in the seedling tray.

Still another object of the present invention is to provide the fluid dispensing means, as described above, with a pair of spray nozzles for creating plant-receiving cavities having a mixture of mud and water. This is accomplished by providing a first spray nozzle which directs a fluid jet, such as a water jet, into the soil to cut a slot. That spray action is immediately followed by another spray nozzle which sprays water in a fan-like action to gently cave in the soil around the previously cut slot so as to create an opening or cavity in the ground containing a mixture of water and soil. This mixture is very conducive to receiving a seedling in a low-impact and non-shocking manner.

A still further object of the present invention is to provide a method and apparatus, as described above, in which the transplanting apparatus is provided with an indexing means selectively operable for sequentially laterally displacing the seedling trays relative to the transplanting apparatus. Each of the seedling trays is provided with a plurality of rows, and the plant setter means are staggered so as to coact with only a preselected row of the trays. The indexing means is operable for indexing the trays laterally across the machine, one cell per planting cycle, to a position beneath a plant setter means for the seedling in a cell to be dispensed or guided into a preformed plant-receiving cavity.

A further object of the present invention is to provide a seedling tray construction which includes cell dimensions configured for receiving soil material and a seedling to enable growth in a greenhouse but which also will permit the plant setter means to urge the seedling downwardly through a cell. In order to construct such a seedling tray, and one which will also be operable for indexing as described above, the present invention contemplates that the cells will have open tops and bottoms, with the dimensions of the top being only slightly greater than those of the bottom, i.e. ¾ inch square on the top and 11/16 inch square on the bottom. Further, the seedling trays are provided with indentations which coact with an indexing means for permitting the trays to be selectively shifted or indexed.

These and additional objects and advantages of the present invention will be more readily appreciated after a consideration of the drawings and the detailed description of the preferred embodiment.

DETAILED DESCRIPTION OF THE PREFERRED EMBODIMENT

As stated at the outset, the present invention is directed to a method and apparatus for automatically transplanting seedlings which contemplates continuously advancing an apparatus along a field and synchronizing the formation of plant-receiving cavities for subsequent insertion of seedlings thereinto. More specifically, the present invention contemplates that the seedlings will be continuously inserted into the cavities by means of plant setters which are actuated for downward movement for engaging against the upper surface of a seedling in a selected cell of a seedling tray for pushing the seedling downwardly therethrough and into a preformed cavity. It is necessary to index the seedling trays after each cycle so that the seedlings may be inserted into a plurality of crop rows.

Figures 1, 2:
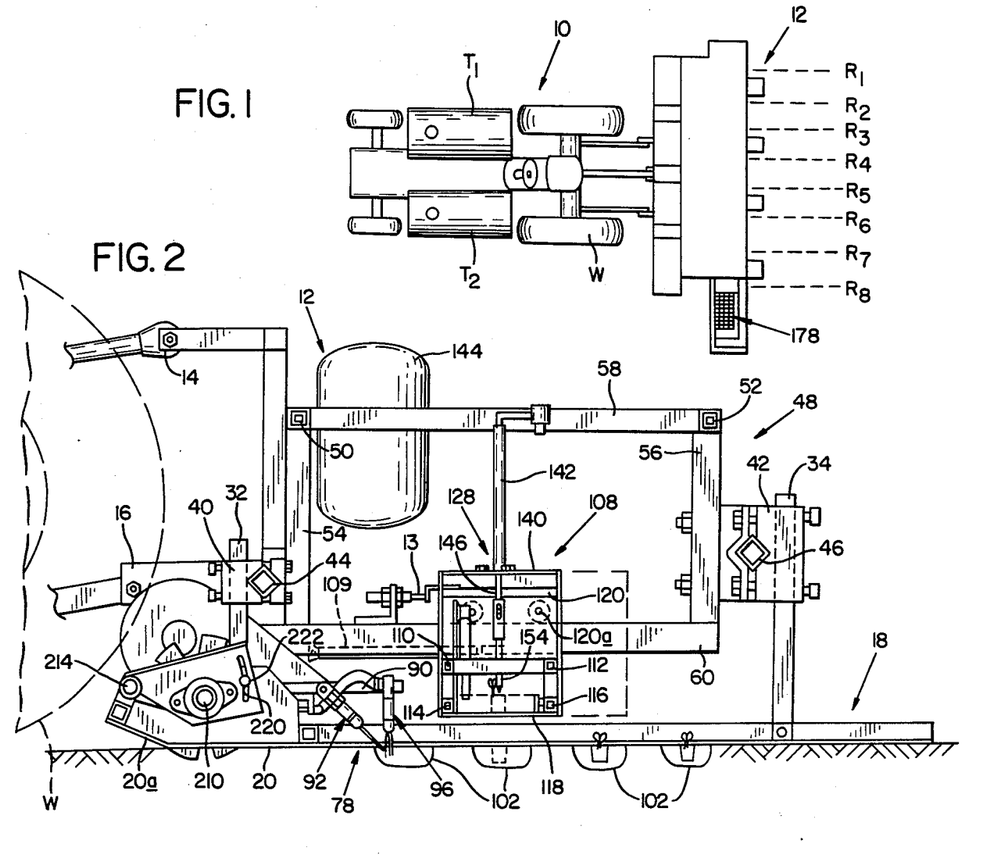
FIG. 1 is a schematic top plan view of an agricultural vehicle, such as a tractor, pulling a transplanting apparatus in accordance with the present invention across a field.
FIG. 2 is a side elevational view of the apparatus of the present invention shown being advanced over a field, with the ground shown in cross section to illustrate formation of plant-receiving cavities.

With the above overview generally in mind, attention is directed initially to FIG. 1 of the drawings which, in reduced scale, illustrates an agricultural vehicle such as a tractor, indicated generally at 10, pulling an apparatus for automatically transplanting crops such as seedlings, in accordance with the present invention, generally indicated at 12. The transplanting apparatus will now be described specifically in an embodiment which is configured for transplanting seedlings into eight crop rows in a field. The eight rows are designated in FIG. 1 at $R_1-R_8$. More detailed drawings of apparatus 12 are set forth in FIGS. 2 and 3 and attention will now be directed to those drawings.

Figure 3:
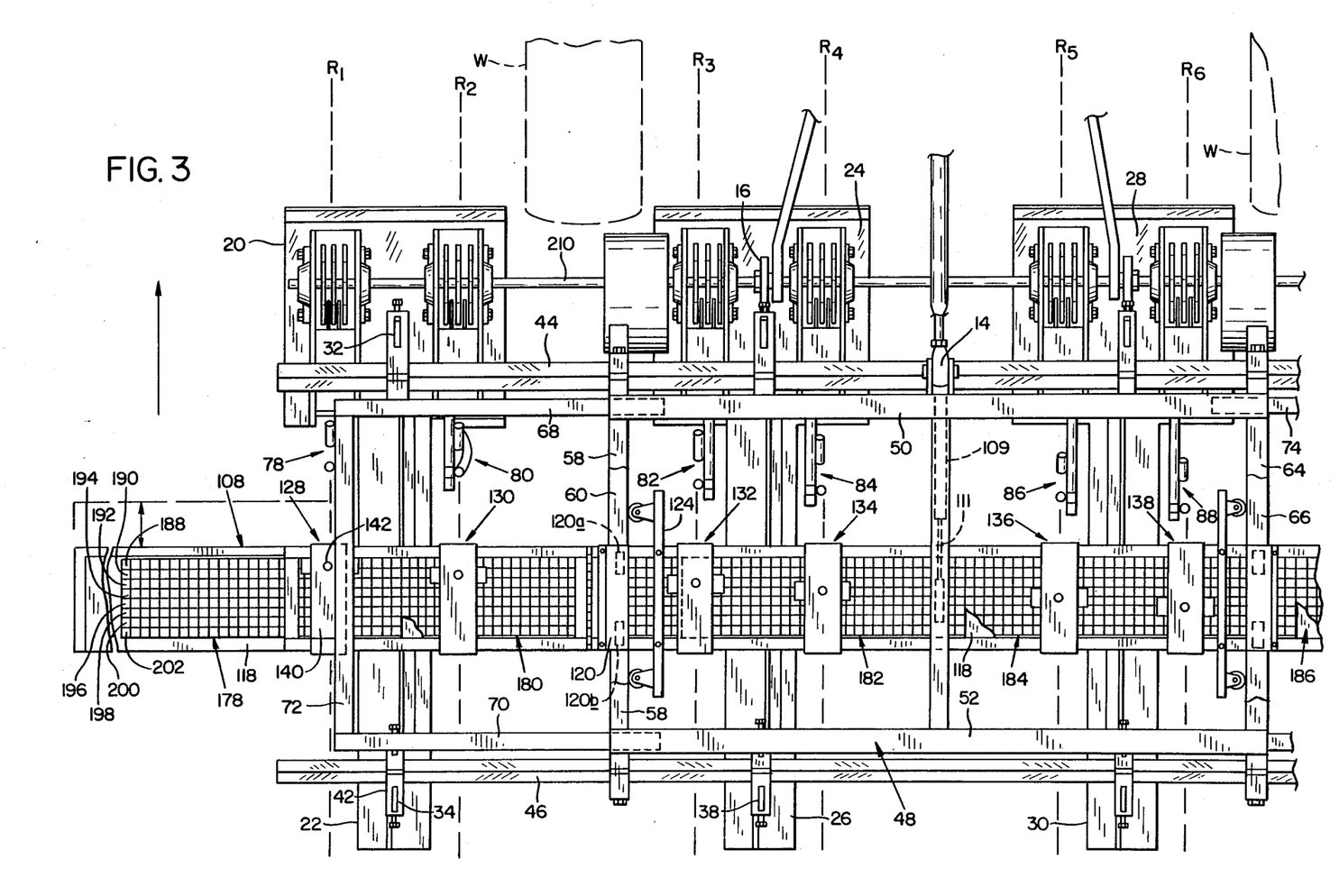
FIG. 3 is an enlarged top plan view of FIG. 2.

As shown in FIG. 2, apparatus 12 is constructed with a frame assembly which defines a vehicle means operable for movement over a field, and includes a three-point hitch arrangement having connections such as indicated at 14, 16 for securing via arms to the rear of tractor 10. Transplanting apparatus 12 is defined by a frame assembly which is made up of several components, the first of which may be thought of as a base or skid assembly, generally indicated at 18. The skid assembly is defined by a plurality of spaced-apart, ground-engaging skid members which can be best seen from a consideration of FIG. 3. For example, a front skid plate 20 is formed with an upwardly extending leading edge 20a and an elongate skid plate 22 extends rearwardly from skid plate 20. Similarly, additional front skid plate and elongate skid plate pairs are provided for connection to one another such as indicated at 24, 26 and 28, 30. FIG. 3 has its right side portion cut off, so that only six crop rows, i.e. $R_1-R_6$ are illustrated, although it is to be understood that if eight rows are to be transplanted, then additional skid plate assemblies would be positioned spaced-apart from that indicated at 28, 30.

Extending upwardly from each of the front and elongate skid plates are uprights such as indicated at 32, 34 which are shown in FIG. 2 as extending upwardly from front and elongate skid plates 20, 22, respectively. Similarly, uprights such as indicated at 36, 38 extend upwardly from front and rear skid plates 24, 26, respectively. Each of the uprights has secured thereto a clamp bracket assembly such as indicated at 40, 42 for supporting elongate, tubular members such as indicated at 44, 46 at the fore and aft ends of the transplanting apparatus. As shown in FIG. 3, tubular members 44, 46 extend generally across the width of the transplanting apparatus and provide a connection for mounting an upper frame assembly generally indicated at 48 (see also FIG. 2). The upper frame assembly is provided as a mount and support for a shiftable carriage means and other components which will be described hereinafter and is generally formed as an elongate box-like frame.

For example, as can be seen from a consideration of FIG. 3, upper frame assembly 48 includes a pair of laterally extending fore and aft members 50,52 which are supported above like members secured via uprights such as indicated at 54, 56. The uprights, such as those indicated at 54, 56 are secured to associated clamping brackets such as those indicated at 40, 42. Upper and lower cross members, such as indicated at 58, 60 are placed at suitable locations to interconnect elongate members 50, 52 and the corresponding members positioned therebeneath. As can be seen from a viewing of the right side of FIG. 3, upper cross member 64, which is shown broken away, is positioned above a lower cross member 66 and interconnects ends of elongate members 50, 52.

It should also be observed that elongate members 50, 52 are hollow for receiving a frame extension such as illustrated to the left of FIG. 3. For example, extension members such as indicated at 68, 70 are bridged together by cross member 72 so that the construction may be shifted toward or away from upper cross member 58 of upper frame assembly 48. Similarly, an extension assembly is provided on the right side of transplanting apparatus 12, extending from elongate members 50, 52 as partially shown by extension members 74, 76. The extension assemblies are provided for supporting pallets of seedling trays which will be fed into the transplanting apparatus in a manner to be hereinafter described. The extension assemblies may be shifted inwardly to provide a compact arrangement during transport of the transplanting apparatus from one field to another.

Attention will now be directed to a fluid dispensing means for forming crop-receiving cavities in accordance with the present invention to be followed up by a description of a carriage means for receiving the seedling trays and a plant setter means for inserting seedlings from the trays into the pre-formed cavities. A plurality of fluid dispensing means are provided adjacent a fore end of the transplanting apparatus and are indicated generally at 78–88, or one for each crop row. As shown in FIG. 2, fluid dispensing means 78, which is typical, is mounted via an arm 90 to a bracket which is secured to a mount provided on front skid plate 20. Similarly, the other fluid dispensing means are mounted on the transplanting apparatus and attention is now directed to FIG. 11 which shows, in enlarged detail, fluid dispensing means 78.

Figures 9, 10, 11:
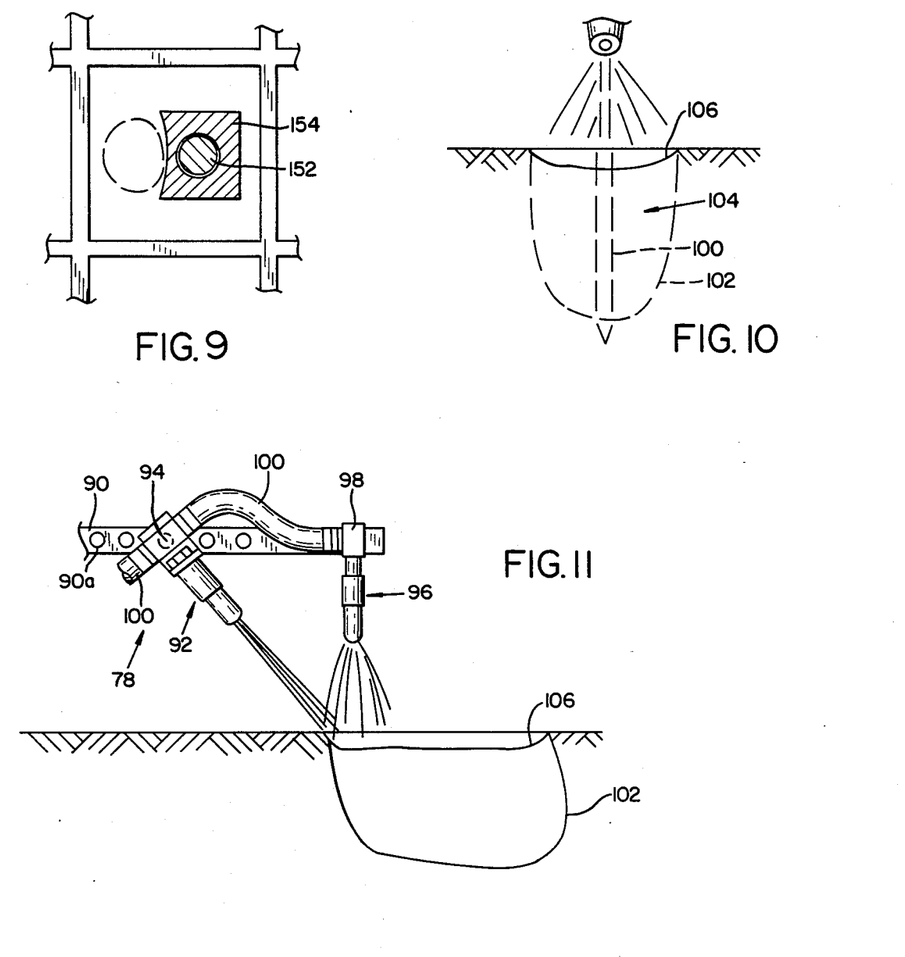
FIG. 9 is an enlarged view of a cell of a seedling tray illustrating positioning of a plant setter on a seedling "plug" to advance the plug downwardly.
FIG. 10 is a cross-sectional view of the ground illustrating how a plant-receiving cavity is formed.
FIG. 11 is a side elevational view, somewhat enlarged, illustrating a fluid dispensing means in accordance with the present invention for forming a plant-receiving cavity.

Each fluid dispensing means includes a pair of nozzles, such as nozzle 92 mounted on bracket 90 by means of a mount 94 and a second nozzle 96 also mounted on bracket 90 by means of a mount such as indicated at 98. Bracket 90 is provided with a plurality of mounting holes such as indicated at 90a for receiving nozzle 92 in different locations relative to nozzle 96 and for also permitting nozzle 92 to be angularly oriented at a preselected relation relative to the ground surface. A fluid-conducting hose, only a portion of which is shown at 100, is connected to the nozzles and directs fluid, such as water, from a pump mounted on tractor 10. As shown in FIG. 1, water storage tanks indicated at $T_1$ and $T_2$ are provided for holding water and are interconnected by means of a pump suitably driven by the tractor and connected via flexible conduits to each of the spray nozzles such as those indicated at 92, 96.

It will be observed that nozzle 92 is of a type which will provide a needle jet spray action while nozzle 96 provides what may be thought of as fan jet action. The reason for the difference in nozzles, each of which will direct spray from a pump generally in the range of 60 to 120 psi (for example, 80 psi), is that it is desired to cut initially a thin trench or slot to be followed up by a wider cut which is created by the fan spray to provide a mud-filled cavity for receiving a plant. More specifically, as can be seen from a consideration of FIG. 10, spray nozzle 92, which precedes spray nozzle 96, initially cuts via its needle jet spray action, a generally thin slot such as indicated at 100 into the ground. Immediately following the slot-cutting action of spray nozzle 92 is nozzle 96 which fans outwardly, as shown in FIG. 10, to cave in gently the dirt walls around the formed trench to create a larger cavity, such as indicated at 102.

The result is a "mudpot" generally indicated at 104 which may be thought of as a water-soil mixture having an upper level, such as indicated at 106, somewhat beneath the normal surface of the field, i.e. in the range of $\frac{1}{8}$–$\frac{1}{4}$ inch below. The width of cavity 102, as shown in FIG. 10, is created to be roughly 1 to $1\frac{1}{4}$ inches and the length in the range of 3 to 4 inches and a depth of 2 inches or thereabouts. The important point to observe is that with spray nozzle 92 initially drilling a slot or hole, fan spray from spray nozzle 96 loosens the soil around that trench or slot to create an overall cavity 102 that has both water and soil in a proper depth with the soil and water not being blown or forced out of cavity 102, but rather residing therewithin for receiving a seedling in a manner to be hereinafter described.

With attention now redirected to FIGS. 2 and 3, a description of a carriage means, generally indicated at 108 will now be set forth. Generally, carriage means 108 is mounted on upper frame assembly 48 in a manner so that it may be selectively operable for reciprocal shifting and positioning relative to the direction of travel of transplanting apparatus 12. More specifically, carriage means 108 is defined by an open box-like frame construction which is mounted for shifting beneath upper frame assembly 48. For instance, carriage means 108 includes (see FIG. 2) laterally extending members 110–116 which extend beneath cross members, such as cross member 60 of upper assembly 48 and a bottom planar surface or floor 118 is provided for receiving seedling trays. Carriage means 108 is suspended on cross members 60, 66 by means of wheeled mounts such as indicated at 120, 122, respectively (see FIG. 3). Each of the mounts includes wheels which engage with the aforementioned cross members to suspend carriage means 108 and permit it to be moved or reciprocated fore and aft. For example, wheeled mount 120 includes wheels 120a, and 120b. Moreover, it should be noted that additional wheeled mounts are provided, such as indicated generally at 124, 126 for maintaining precise lateral positioning of carriage means 108 for also permitting same to be reciprocally shifted.

As mentioned previously, carriage means 108 is provided for supporting a plurality of plant setter means which are utilized for dislodging a seedling from a selected cell in a selected row of a seedling tray and then guiding and inserting the seedling into a pre-formed cavity. The plant setter means are generally designated at 128–130 and are positioned over an associated row $R_1$–$R_6$. Each of the plant setters, such as that indicated at 128 (see FIG. 2) is mounted by means of a bracket 140 to carriage means 108. As shown in FIG. 2, plant setter 128 includes a fluid-actuated (such as pneumatic) cylinder 142 which is secured to bracket 140 and is connected via suitable pneumatic lines (not shown) to an accumulaton 144 which, in turn, is connected to a compressor (not shown) driven by the tractor. Extending downwardly from cylinder 142 is a rod 146 which actuates a mechanism for dislodging a seedling from a cell and for controllably guiding and vertically inserting it into a cavity. For a more detailed description of the plant setter means, reference is directed to FIGS. 12–15 which illustrate how plant setter means 128 operates.

Figure 12:
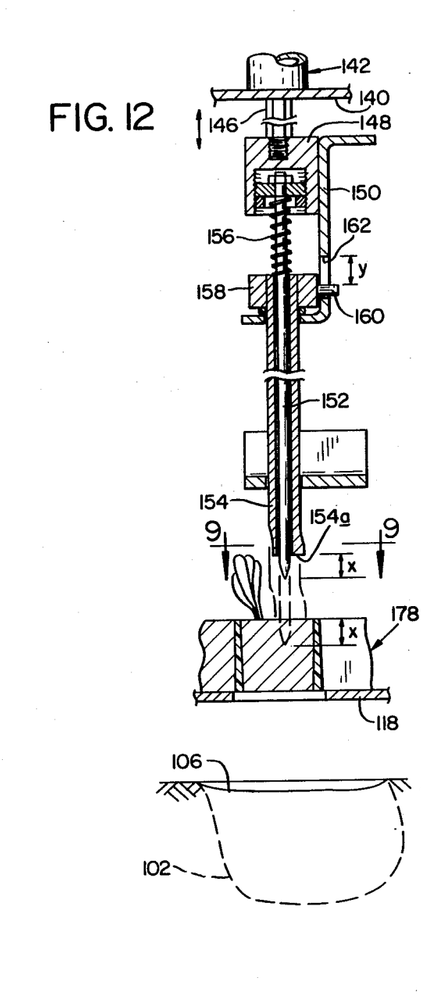
FIGS. 12-15 illustrate in sequential action of the plant setter means of the present invention in dislodging a seedling from a cell of a seedling tray and inserting the seedling into the ground.

Generally, the plant setter means is selectively operable for engaging a selected seedling and urging it substantially vertically downwardly into a plant-receiving cavity. As shown in FIG. 12, rod 146 of plant setter means 128 is secured to an end 148 which, in turn, is mounted to an angle-shaped bracket 150. Extending from end 148 and secured thereto is an elongate rod which may be thought of as a guiding or impaling means 152. The impaling means is slidably received within a sleeve 154 having a foot 154a which may be thought of as a pusher means for dislodging a seedling from a cell and moving it downwardly into a cavity. The pusher means is normally biased away from end 148 by spring 156 and is secured to a member 158 having a pin 160 extending outwardly therefrom for movement between the ends of a slot 162 formed in bracket 150. In operation, at the appropriate time during a planting sequence, which will be described at a later point herein, cylinder 142 is actuated so as to extend rod 146 as shown in FIG. 12 in the dotted line portion until a pointed end of impaling means 152 extends into a seedling and an end of pusher means 154 engages the upper portion of the seedling.

Figure 13:
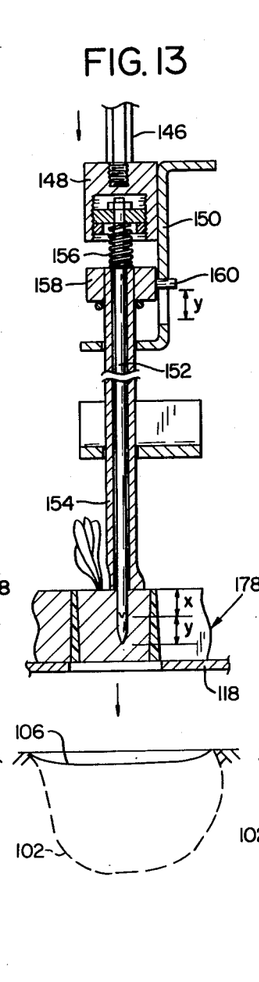
Figure 14:
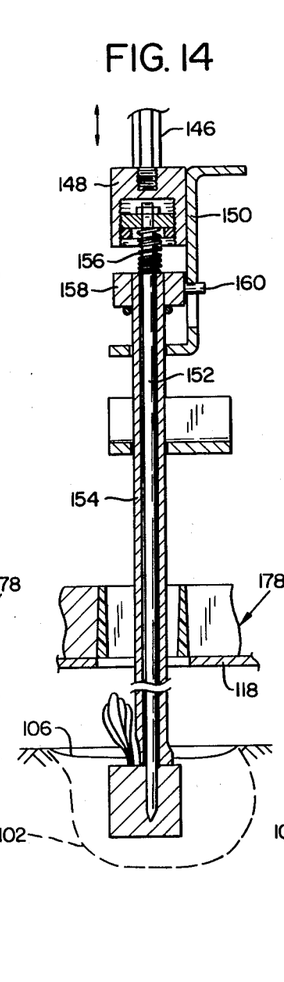
Figure 15:
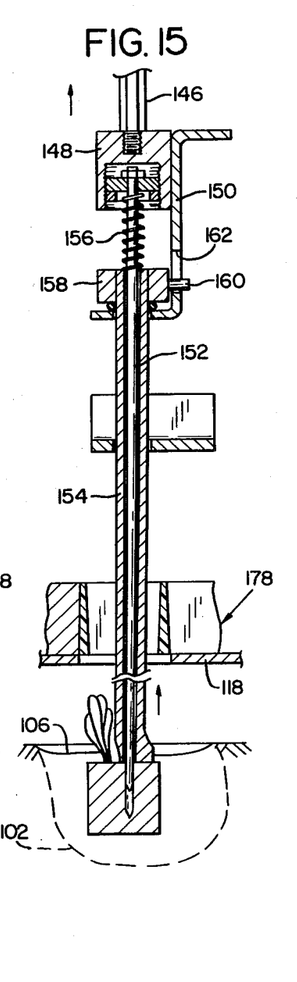

As shown in FIG. 13, rod 146 is extended further downwardly thereby compressing spring 146 to impale impaling means 152 further into the seedling. As shown in FIG. 14, further lowering of rod 146 pushes the seedling down through the bottom of the cell and an appropriate hole formed in floor 118 so that the seedling is inserted into the cavity. During insertion or downward pushing of pusher means 154, the seedling remains held and guided on impaling means 152, so that it moves vertically downwardly without kicking off to one side or the other for insertion into the cavity. Upon retraction, as shown in FIG. 15, upward retraction of rod 146 results in impaling means 154 being initially retracted from its furthest extended position in the seedling upwardly through pusher means 152 to a point where there is little frictional engagement between impaling means 152 and the seedling. Thereupon, further upward shifting of rod 146 detaches engagement of foot 154a of pusher means 154 from the seedling and the sequence may continue.

Figures 6, 7:
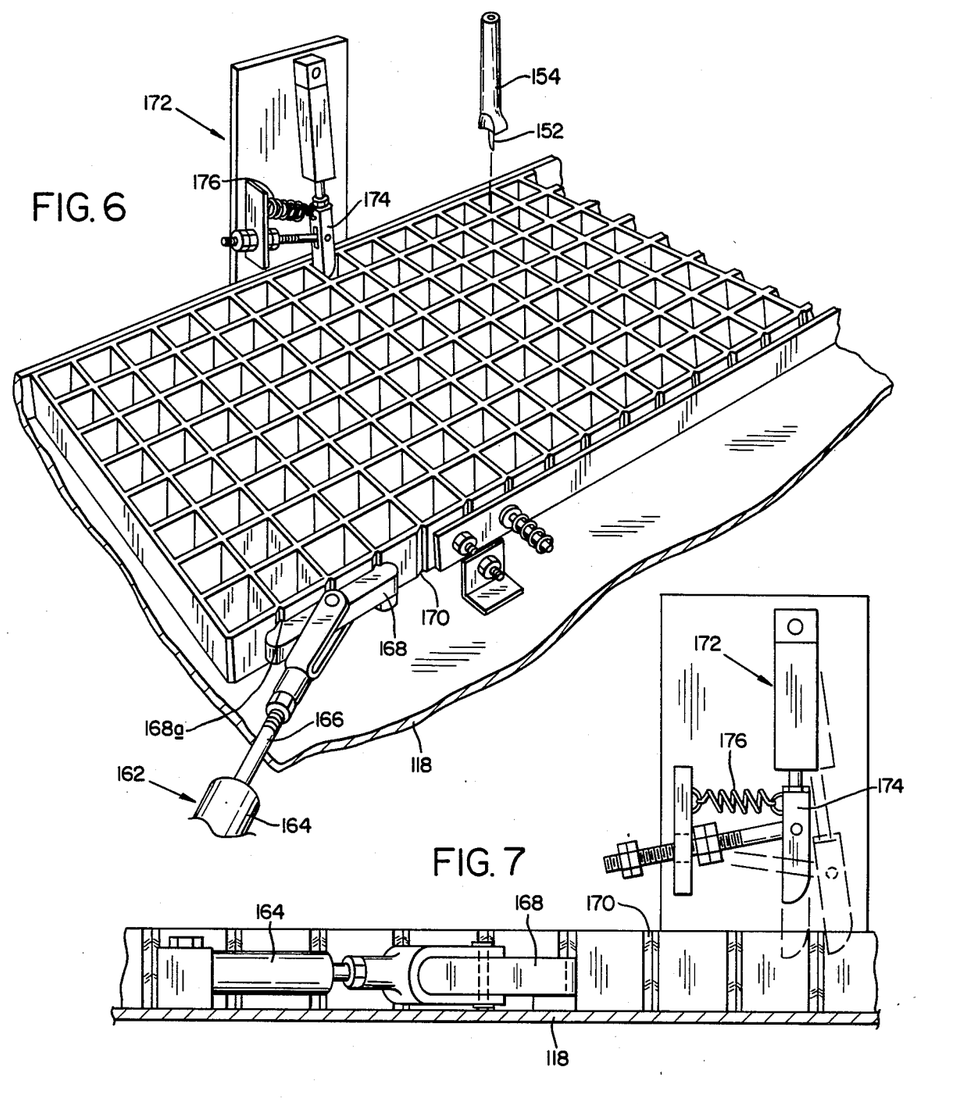
FIG. 6 is an enlarged perspective view illustrating a seedling tray and an indexing means for shifting the seedling tray.
FIG. 7 is a side elevational view of FIG. 6.
Figure 8:
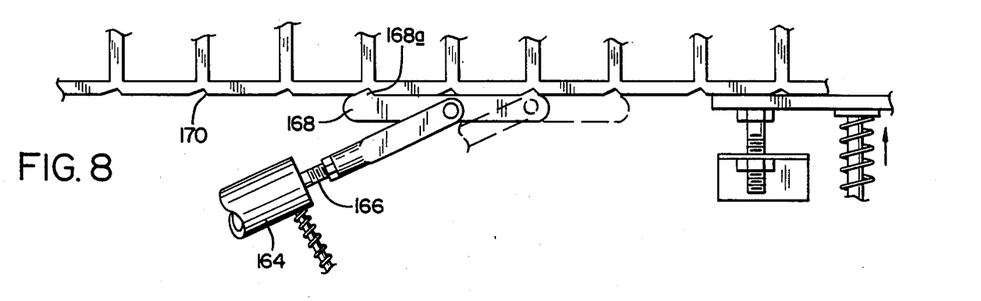
FIG. 8 is a top plan view of a portion of FIG. 7 to illustrate further details.

Turning now to FIG. 6, there is shown an indexing means generally indicated at 162 which includes a cylinder 164 pneumatically operated for extending and retracting a rod 166 which, in turn, is connected to a tray engagement means or finger 168 having extensions 168a (see also FIG. 8) for insertion into recesses 170 formed alongside each seedling tray adjacent each cell. The idea is that indexing means 162 may be actuated so that finger 168, with its extensions 168a, engages selected recesses of the seedling tray so as to move the tray, upon reciprocation of rod 166, in a direction toward the right of FIG. 6 and toward the right of FIG. 3. The indexing means is not specifically shown in FIG. 3, but would be mounted adjacent the first tray, such as that indicated at the left for moving that tray, and those which follow it to the right, in a direction toward the right. An indexer stop is generally designated at 172 in FIGS. 6 and 7 and includes a pawl means 174 which is spring-biased by means of a spring 176 for insertion into an empty cell to hold a tray into a locked position during a planting sequence. The pawl means will suitably ride up out of a cell after a planting sequence. While the seedling tray is shown empty in FIGS. 6–8, it will be understood that the indexer stop will be disposed at a downstream end of carriage means 108 so that the pawl means will only be inserted into a first empty row.

Rounding out a description of the transplanting apparatus, prior to setting forth an operational sequence, it will be noted that an actuating cylinder 109 is suitably connected to carriage means 108 for extending and retracting a rod 111 which is secured to carriage means 108. The various pneumatically operated devices disclosed above, such as the plant setter means, the indexing means, actuating means 109, are all connected via suitable conduits to a pneumatic source and a timer is also provided which sequentially operates each of the components according to a synchronized pattern. That timer also synchronizes actuation of the fluid dispensing means for forming the plant-receiving cavities. While a timer, water pump, suitable valving and an air compressor and hoses are not shown, it will be understood that such would be utilized in order to sequence the operation of the transplanting apparatus as described immediately below.

Operation of the Transplanting Apparatus

The method and apparatus of the present invention provide for an efficient means to transplant automatically crops such as seedlings of celery, artichokes, lettuce, cauliflower, tomatoes, broccoli, brussel sprouts, beets, asparagus, etc. from seedling trays into preformed cavities in a field. Crops such as celery may be thought of as high-density crops, i.e. there may be plantings of 45,000 seedlings per acre and the present invention contemplates a method and apparatus which will accommodate such a planting schedule in a relatively short period of time. Seedling trays in accordance with the present invention are used to germinate seedlings in a greenhouse. While germination time depends on the particular type of plant, generally germination in a greenhouse may take anywhere from three to six weeks. The seedling trays of the present invention are defined by a plurality of cells which have open tops and bottoms filled with humus for accommodating the root structure of the seedling. The seedling trays of the present invention have a square upper opening of ¾ of an inch to a side with the bottom openings being only slightly smaller, i.e. 11/16 inch or so to a side. The resultant construction is different from that disclosed in U.S. Pat. No. 3,667,159 which sets forth a seedling tray having downwardly tapering cells for retaining a potting medium therein. In the present invention, the seedling trays have open tops and bottoms because it is desired to move a seedling from a cell into a preformed cavity.

With attention now directed to FIGS. 2 and 3, operation of the transplanting apparatus in accordance with the method of the present invention will now be set forth. Initially, it is presumed that the water tanks $T_1$ and $T_2$ are filled and tractor 10 and transplanting apparatus 12 are moved to a field and hitched together. Assuming that a total of eight rows are to be transplated, the tractor's wheels are positioned for transport between beds which are to contain the rows. For example, $R_1$, $R_2$ and $R_3$, $R_4$ are on elevated beds as are rows $R_5$, $R_6$ and $R_7$, $R_8$. Seedling trays with seedlings therein are loaded in an aligned array on floor 118 of carriage means 108. As shown in FIG. 3, seedling trays 178, 180, 182, 184 and 186 are loaded into carriage means 108. It will be observed that each of the seedling trays includes eight rows such as indicated at 188–202. Each of the rows is disposed so that a cell in a row may be positioned selectively beneath a plant setter means and its associated impaling and pusher means. For example, each of the cells in row 188 may be subsequently aligned for positioning beneath plant setter 128, each of the cells of row 190 may be aligned for positioning directly beneath plant setter 130, etc. It will be noted that plant setters 128, 130, 132, etc. are aligned along a diagonal, relative to a line perpendicular to the direction of travel, because they are predimensioned for alignment over a planting row, such as $R_1$, $R_2$, etc. as well as over a row in a seedling tray such as rows 188, 190, etc. Similarly, in order to ensure that the preformed cavities are aligned along rows $R_1$, $R_2$, etc. in the proper arrangement to receive seedlings, fluid dispensing means 78, 80, 82, etc. are also aligned diagonally along a diagonal parallel to that interconnecting the plant setters.

Figure 4:
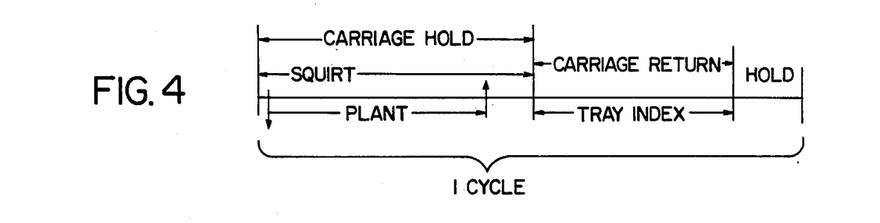
FIG. 4 is a diagram of a transplanting sequence in accordance with the method of the present invention.
Figure 5:
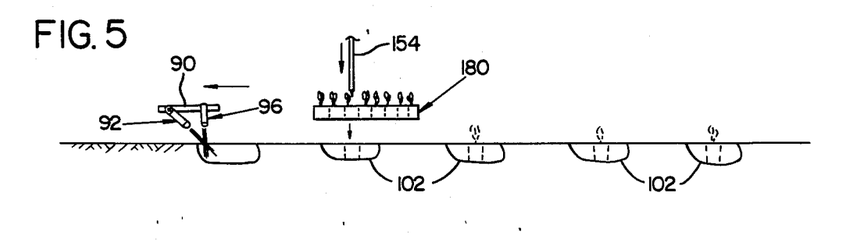
FIG. 5 is a simplified side elevational view of the planting sequence.

Once the transplanting operation is to begin, the timer (not shown) is set and the water pump, pneumatic valves, etc. are brought on line. Carriage means 108 is initially positioned forwardly by cylinder 109 retracting rod 111 until the front of the carriage means engages stop 113. At this point, each of the plant setter means, such as that indicated at 128, are retracted so that impaling means 152 and pusher means 154 are in their retracted positions. As tractor 10 is advanced at a predetermined rate, the fluid dispensing means, such as those indicated at 78, 80, 82, etc. are all simultaneously actuated so as to form the plant-receiving cavities. The fluid injection step will occur for roughly over one-half of a cycle, as shown in FIG. 4. Depending on the type of plants and spacing, a cycle may range roughly somewhere in the neighborhood of one second or thereabouts. It is to be understood that transplanting apparatus 12 is being continuously advanced, and therefore the cavities which are formed are somewhat elongate as shown in FIGS. 2 and 12–15. During the injecting of liquid into the ground, rod 111 is being advanced rearwardly at a rate equal to the rate of forward travel of tractor 10, therefore maintaining carriage means 108 stationary relative to the ground. During this time, as shown in FIG. 4, the plant setter means are actuated so as to simultaneously discharge seedlings into those cavities which were previously formed.

Plant setter means 128, 130, 132, etc. are actuated so that their associated impaling means and pusher means engage, hold and controllably guide in a vertical manner seedlings into a cavity for release or discharge. Thus, plant setter means 128 is actuated above a selected cell in seedling tray row 188, plant setter means 130 is actuated so as to engage a seedling in a selected cell in row 190, etc. After the seedlings have been deposited into an associated cavity, the impaling means and pusher means are retracted via the retraction of the plant setter rods, such as rods 146. The retraction occurs prior to the return of carriage means 108 to a front position by actuation of cylinder 109 to retract rod 111. During the carriage return step, indexing means 162 is actuated so as to shift tray 178, and correspondingly the downstream trays, toward the right of FIG. 3 so that the next cell in each row is placed beneath its associated plant setter means. This is done immediately prior to the fluid dispensing means being actuated again for repeating the cycle. The cycle is continuously repeated and trays may be placed in at the left side of carriage means 108 (see FIG. 3) so that a continuous feeding and automatic transplanting operation can take place. As a tray is used up at the right-hand side of transplanting apparatus 12 as shown in FIG. 3 (actually beyond $R_8$ which is not shown in FIG. 3) the seedling tray may be removed. In any event, it should be appreciated that continuous sequential transplanting of seedlings will take place automatically with each of the rows in the seedling trays being depleted.

It will be observed that there are a pair of grinder means such as indicated at 204, 206 mounted on suitable brackets provided on front skid 20. Each of the grinder means includes blade members such as indicated at 208 which are driven by means of a shaft 210. The shaft is driven by a hydraulic motor (not shown) and a gear-reduction box is indicated at 212. As shown in FIG. 2, a front pivot indicated at 214 is provided for supporting a pair of mounting brackets, indicated at 216, 218, which support shaft 210. The other grinder blades are similarly mounted and the brackets may be pivoted along track 220 and held in a preselected position by means of a fastener 222. The purpose of such a construction is to enable an operator to engage selectively the grinder means for contact with the soil along a row prior to formation of the plant-receiving cavities. The grinder means may become necessary in certain types of soil conditions. For example, if the soil is lumpy, it may need to be chopped or ground up in order to have a proper plant-receiving cavity formed therein. Another problem condition results when adobe-like soils become compacted and dried. Therefore, it becomes necessary to prepare the soil by use of the grinder means prior to creating the plant-receiving cavities.

It should be noted that the skid plates provide a very important function, namely, maintain the elevation of floor 118 of carriage means 108 in a predetermined substantially constant elevation above the ground. This is important because the plant setter means are actuated so as to extend a preselected distance when inserting a seedling plug into the ground. It is desired to always place the seedling plugs at the same depth in the ground and therefore it is important that floor 118 be consistently positioned at a constant elevation above the ground. Skid assembly 18 which includes the ground-engaging skid members such as front skid plates 20 and elongate skid plates 22, etc. ensures this result.

Throughout the specification, the term "seedling" has been used and it is felt that a clarification may be required at this point. Specifically, the seedling trays, which include a plurality of cells arranged in rows, are used to grow the seedlings in a soil medium in a greenhouse. That soil medium may be a standard mix, such as 50 percent peat and 50 percent vermiculite. The mix, in which the seed germinates, forms what may be thought of as a "plug" in which the seedling grows. This point is mentioned here because in the planting sequence, it is to be understood that impaling means 152 extends into the "plug" and foot 154a of pusher means 154 engages the upper surface of the seedling "plug". As shown in FIG. 9, the seedling proper actually germinates from a position offset in the plug and the longitudinal axis of impaling means 152 is offset from the center of the plug thereby orienting pusher means 154 and impaling means 152 in a position so that during the extension of the plant setter means, contact with the seedling proper, i.e. its leaves and root system, is substantially avoided. Thus, it should be appreciated that when the seedling trays of the present invention are seeded prior to their being placed in a greenhouse for germination, the individual seeds are placed in an offset position in the soil medium in each cell of a seedling tray.

While the present invention has been shown and described with reference to the foregoing preferred embodiment, it will be appreciated by those skilled in the art that other changes in form and detail may be made without departing from the spirit and scope of the invention as defined in the appended claims.

It is claimed and desired to secure by Letters Patent:

1. A method for transplanting seedling plugs from seedling trays having cells aligned in separate rows into a plurality of spaced-apart crop rows in a field comprising:
   orienting the seedling trays by a vehicle means over a field to be transplanted;
   forming a plurality of laterally spaced-apart plant-receiving cavities in the ground aligned on the crop rows;
   maintaining the seedling trays substantially stationary relative to the field at selected intervals during travel of the vehicle means;
   engaging upper surfaces of the seedling plugs in different rows of the seedling trays and displacing them substantially vertically downwardly through and free from a cell while holding the seedling plugs by impaling means for insertion into the plant-receiving cavities; and
   releasing the seedling plugs from the impaling means into associated plant-receiving cavities.

2. The method of claim 1 wherein the orienting step includes intermittent shifting of the seedling trays in a lateral direction relative to the direction of travel of the vehicle means.

3. The method of claim 2 wherein the plant-receiving cavity forming step includes forming a first slot by a fluid jet followed by spraying a fluid in fan-like action over the slot.

4. Apparatus for automatically transplanting seedling plugs from cells aligned in rows in a seedling tray into a plurality of spaced-apart crop rows in a field comprising:
   vehicle means operable for traveling over the field;
   a plurality of cavity-creating means mounted on the vehicle means selectively operable for forming a plurality of laterally spaced-apart plant-receiving cavities aligned on the crop rows;
   carriage means mounted on the vehicle aft of the cavity-creating means for receiving seedling trays; and
   plant setter means operable for selectively engaging upper surfaces of seedling plugs in the seedling trays and displacing them substantially vertically downwardly through a cell for insertion into plant-receiving cavities, each plant setter means including a guide means disposed over an associated crop row operable for engaging a seedling plug in a selected cell and holding the seedling plug substantially aligned along a vertical axis while the seedling plug is displaced downwardly through the cell so that it is moved free from engagement therewith for insertion into a plant-receiving cavity, each guide means being defined by impaling means longitudinally received and shiftable within a pusher means, the impaling means initially engaging a seedling plug for penetration thereinto followed by the pusher means engaging the seedling plug.

5. The apparatus of claim 4 further including means for shifting the carriage means relative to the vehicle means to enable selective positioning of the carriage means substantially stationary relative to the field during travel therealong by the vehicle means.

6. The apparatus of claim 5 further including indexing means operable for selectively shifting the seedling trays.

7. The apparatus of claim 4 wherein the guide means are oriented along a centerline diagonal relative to a line perpendicular to the direction of vehicle means travel so that a guide means is positioned above each row of the seedling trays.

8. The apparatus of claim 7 wherein each fluid dispensing means includes a first nozzle for injecting a jet of fluid into the ground followed by an aligned second nozzle operable for dispensing a fan-like spray onto the ground.

9. The apparatus of claim 8 wherein the fluid dispensing means are aligned along a centerline substantially parallel to the diagonal centerline of the guide means.

10. The apparatus of claim 7 wherein the cavity-creating means is defined by fluid dispensing means selectively operable for directing fluid against the ground.

* * * * *